No. 812,157. PATENTED FEB. 6, 1906.
F. H. THOMPSON.
COMBINED ANIMAL TETHER AND FEED BAG.
APPLICATION FILED APR. 1, 1905.
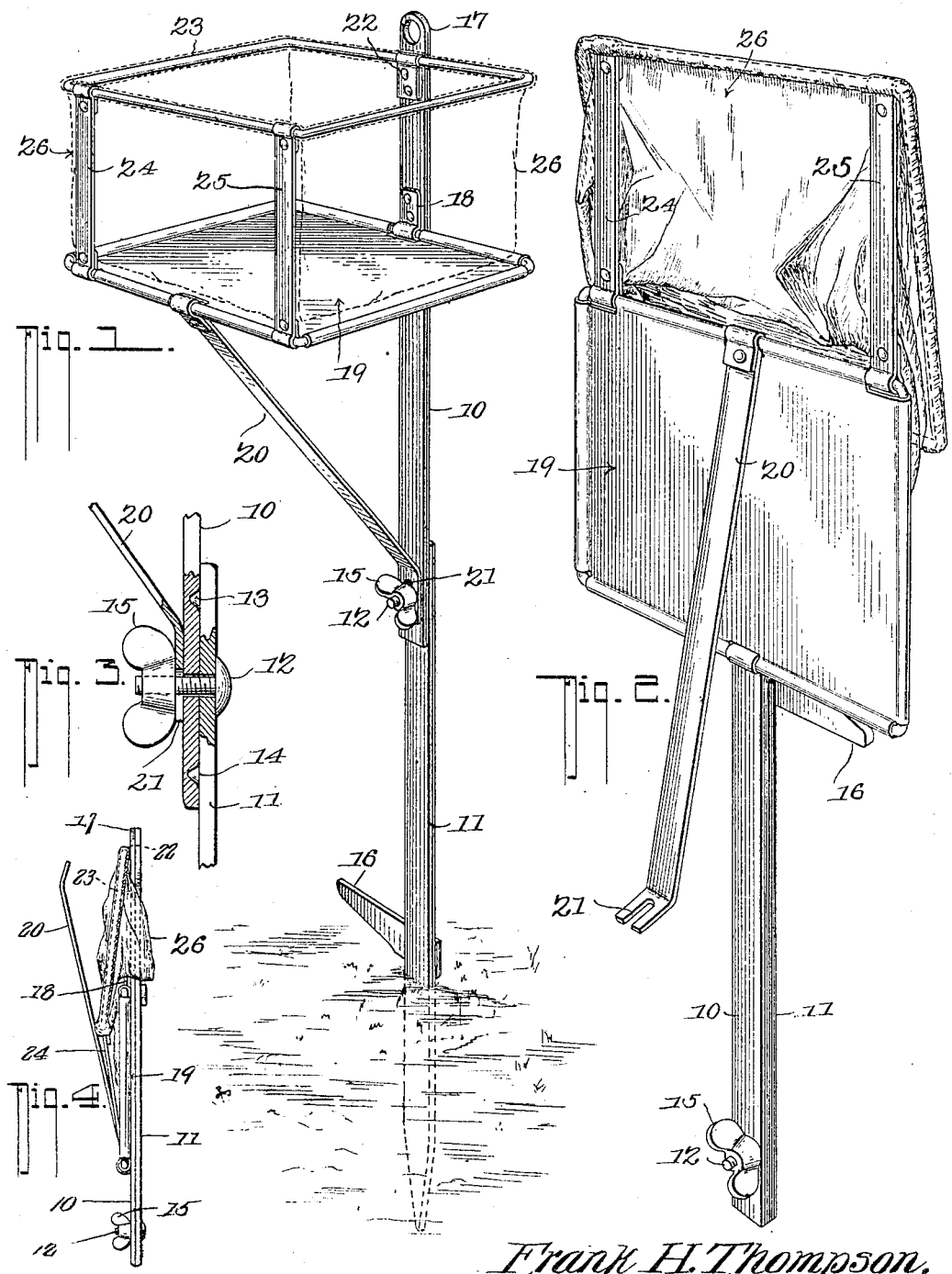
Witnesses
Frank H. Thompson,
Inventor.
by C. A. Snow & Co.
Attorneys

UNITED STATES PATENT OFFICE.

FRANK H. THOMPSON, OF HAW RIVER, NORTH CAROLINA.

COMBINED ANIMAL TETHER AND FEED-BAG.

No. 812,157. Specification of Letters Patent. Patented Feb. 6, 1906.

Application filed April 1, 1905. Serial No. 253,295.

*To all whom it may concern:*

Be it known that I, FRANK H. THOMPSON, a citizen of the United States, residing at Haw River, in the county of Alamance and State of North Carolina, have invented a new and useful Combined Animal Tether and Feed-Bag, of which the following is specification.

This invention relates to devices for tethering and feeding animals, and has for its object to produce a simply-constructed and easily-operated device, whereby the tethering means and the feed-receptacle are combined in one structure, which may be extended for use and collapsed or folded when not in use.

The invention consists in a standard having means at one end for inserting into the ground and with means at the other end for receiving the hitching-strap or other tethering appliance and with a collapsible feed-receptacle attached thereto.

The invention consists, further, in a standard foldable intermediately, with means at the free end of one foldable portion for insertion into the ground and with means at the free end of the other portion for receiving the hitching appliance, and a collapsible feed-receptacle connected to one of said foldable portions.

The invention further consists in certain novel features of construction and combination of parts, as will be hereinafter more fully described and claimed.

In the accompanying drawings, forming a part of this specification, and in which like reference characters are employed to denote corresponding parts, there is illustrated one form of the embodiment of the invention capable of carrying the same into practical operation, it being understood that the elements therein exhibited may be varied or changed as to form, proportions, or assemblage of parts without departing from the principle of the invention or sacrificing any of the advantages of the same.

In the drawings, Figure 1 is a perspective view of the improved device in distended or operative position. Fig. 2 is a similar view, on an enlarged scale, with the parts folded or collapsed. Fig. 3 is a sectional detail illustrating the construction of the joint uniting the standard members. Fig. 4 is a side elevation illustrating the preferred means for folding or collapsing the same.

The improved device comprises a standard formed in two portions 10 11, united by a clamp-bolt 12 and with spaced spurs 13 14 on the member 11 for entering corresponding cavities in the member 10 when the members are distended, as indicated in Fig. 3, to form a rigid coupling between the parts with a single clamp-bolt, the latter having a wing-nut 15 to facilitate the operation of the coupling means.

The lower end of the member 11 is pointed for facilitating the insertion into the ground, and to further increase the convenience of this operation a lateral bar 16 is attached to the member 11, upon which the foot of the operator may be placed when inserting into the ground, the bar also serving as a stop to limit the downward movement and prevent the member 11 being thrust too far into the ground. This latter function of the bar is important when the device is disposed in soft ground.

The upper end of the member 10 is provided with an eye 17 to receive the hitching-strap or other tethering appliance. Hinged, as at 18, to the standard member 10 is a plate 19, preferably of sheet metal with a wire binding, as shown, and with a brace 20 swinging from its free edge, the free end of the brace forked, as at 21, to engage the bolt 12 between the wing-nut 15 and the member 10, and thus be clamped in position thereby to hold the plate 18 at right angles to the portion 10 of the standard. Hinged at 22 to the portion 10 of the standard is a rectangular frame 23, corresponding to the plate 19 and spaced therefrom and coupled thereto at its free edge to the free edge of the plate by spaced links 24 25, swinging at their ends, respectively, to the frame and plate. Suspended from the frame 23 is a feed-receptacle 26, preferably of canvas or other suitable fabric and conforming in shape to the frame and plate and resting by its bottom upon the latter when distended.

By this simple construction it will be obvious that a simply-constructed device is produced which may be quickly distended and set up at any required point and as quickly collapsed when not required and stored in a small space, as a wagon-box, under the seat of a buggy or carriage, or other similar locality.

The device will preferably be wholly of metal, except the receptacle, and may be collapsed as in Fig. 2 or as in Fig. 4, as may be preferred.

The device will occupy less space when folded as in Fig. 4 and will preferably be folded in that form; but no limitation is to be placed upon the means for folding the device, as will be understood.

Having thus described the invention, what is claimed is—

1. A standard adapted at one end for insertion into the ground and with a collapsible feed-receptacle at the other end.

2. A standard formed in two sections, clamping means for movably uniting the adjacent ends of said sections, the free end of one of said standard-sections for insertion into the ground, and a collapsible feed-receptacle connected to the other standard-section.

3. A standard disposed in vertical position, means for tethering an animal to said standard, and a collapsible feed-receptacle attached to said standard.

4. A standard, a frame swinging from said standard, means for supporting said frame at right angles to said standard and a flexible feed-receptacle suspended from said frame.

5. A standard formed in two sections, clamping means for movably uniting the adjacent ends of said sections one of said sections adapted for insertion into the ground, a frame swinging from the other of said standard-sections, and a flexible feed-receptacle suspended from said frame.

6. A standard formed in two sections, clamping means for movably uniting the adjacent ends of the two sections with one of said sections adapted for insertion into the ground, a frame swinging from the other of said standard-sections, supporting means extending between said frame and standard and detachably connected thereto, and a collapsible feed-receptacle suspended from said frame.

7. A standard, a frame swinging from said standard, detachable means for supporting said frame extended from said standard, and a flexible feed-receptacle suspended from said frame.

8. A standard, a frame swinging from said standard, a plate swinging from said standard and spaced from said frame, links movably coupling said frame and plate, means for supporting said plate and the frame coupled thereto in extended position and a flexible feed-receptacle suspended from said frame and bearing upon said plate when distended.

9. A standard, a frame swinging from said standard, a plate swinging from said standard and spaced from said frame, links movably coupling said frame and plate, a brace member swinging from said plate, means for coupling the free end of said brace member detachably to said standard, and a flexible feed-receptacle suspended from said frame and bearing upon said plate when extended.

10. A standard formed in two sections movably united by a clamp-bolt, a frame swinging from one of said standard-sections, and a plate swinging from one of said standard-sections and spaced from said frame, links movably connecting the free ends of said frame and plate, a flexible feed-receptacle suspended from said frame and bearing upon said plate when distended, and a brace member swinging from said plate and engaging said clamp-bolt and held in operative position thereby.

11. A standard formed in two sections having transverse apertures for receiving a clamp-bolt, one of said standard-sections having spaced studs and the other standard-section having spaced recesses for receiving the studs when the standard-sections are disposed in longitudinal alinement, in combination with a collapsible feed-receptacle connected to one of said standard-sections.

12. A standard formed in two sections, clamping means for movably uniting the adjacent ends of said sections, one of said sections adapted for insertion into the ground, and with a laterally-extending stop extending therefrom to limit the movement, in combination with a collapsible feed-receptacle connected to the other standard-section.

In testimony that I claim the foregoing as my own I have hereto affixed my signature in the presence of two witnesses.

FRANK H. THOMPSON.

Witnesses:
J. H. BLACKMORE,
T. HOLT LAIRD.